US012648884B2

(12) United States Patent
Zhang

(10) Patent No.: US 12,648,884 B2
(45) Date of Patent: Jun. 9, 2026

(54) PEDAL ADJUSTMENT MECHANISM AND NURSING VEHICLE WITH SAME

(71) Applicant: WONDERLAND SWITZERLAND AG, Steinhausen (CH)

(72) Inventor: Xiaojian Zhang, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 342 days.

(21) Appl. No.: 18/526,430

(22) Filed: Dec. 1, 2023

(65) Prior Publication Data

US 2024/0180763 A1 Jun. 6, 2024

(30) Foreign Application Priority Data

Dec. 2, 2022 (CN) ........................ 202211541364.1

(51) Int. Cl.
*A61G 5/12* (2006.01)

(52) U.S. Cl.
CPC .................................. *A61G 5/128* (2016.11)

(58) Field of Classification Search
CPC .. A61G 5/00; A61G 5/12; A61G 5/128; B62J 25/04
USPC ...................................................... 280/250.1
See application file for complete search history.

(56) References Cited

U.S. PATENT DOCUMENTS 6,217,050 B1 * 4/2001 Dickie ................ A61G 5/1089 280/291

FOREIGN PATENT DOCUMENTS

CN 216021725 U * 3/2022

* cited by examiner

*Primary Examiner* — Valentin Neacsu
*Assistant Examiner* — Mitchell James Price
(74) *Attorney, Agent, or Firm* — HAUPTMAN HAM, LLP

(57) ABSTRACT

A pedal adjustment mechanism, including a connecting pipe connected to a nursing vehicle, a carriage, a first end of the connecting pipe inserted into the carriage, the carriage is slidable in an axial direction of the connecting pipe and the carriage is rotatable relative to an axis of the connecting pipe, a pedal, the carriage fixedly connected to a lower surface of the pedal, the pedal is slidable and/or rotatable together with the carriage, and a fixed seat, the first end of the connecting pipe fixedly connected in the fixed seat, the fixed seat engaged with the carriage, the carriage includes a lock and an unlock position in the axial direction of the connecting pipe, and the carriage is slidable between the lock and unlock position to correspondingly engage and disengage with the carriage, and the carriage is rotatable relative to the axis of the connecting pipe.

13 Claims, 9 Drawing Sheets

PEDAL ADJUSTMENT MECHANISM AND NURSING VEHICLE WITH SAME

CROSS REFERENCE TO RELATED APPLICATION

This application claims priority to Chinese patent application No. 202211541364.1, filed on Dec. 2, 2022, the entire content of which is incorporated herein by reference in its entirety.

TECHNICAL FIELD

The present disclosure relates to the field of nursing vehicle technologies, and in particular, to a pedal adjustment mechanism and a nursing vehicle with the same.

BACKGROUND

Nursing vehicles are generally used by people with limited mobility, such as the elderly, the disabled, and patients with limited mobility. Generally, the nursing vehicles are provided with pedals to facilitate users to place their feet. However, in common nursing vehicles on the market, positions or angles of the pedals cannot be adjusted, or adjustment is relatively troublesome, and the users may not operate the pedals independently, thereby causing inconvenience to the users. In extreme cases, safety risks may even be brought to the users.

SUMMARY

Based on this, there is a need to provide a pedal adjustment mechanism and a nursing vehicle with the pedal adjustment mechanism with respect to the above technical problems. The pedal adjustment mechanism can be operated independently by a user of the nursing vehicle without assistance of others, making a pedal adjustment operation simple and convenient.

According to one aspect of the present disclosure, a pedal adjustment mechanism for a nursing vehicle is provided, the pedal adjustment mechanism includes: a connecting pipe, the connecting pipe connected to a nursing vehicle; a carriage, a first end of the connecting pipe being inserted into the carriage, so that the carriage is slidable in an axial direction of the connecting pipe and the carriage is rotatable relative to an axis X of the connecting pipe; a pedal, the carriage being fixedly connected to a lower surface of the pedal, so that the pedal is slidable and/or rotatable together with the carriage; and a fixed seat, the first end of the connecting pipe being fixedly connected in the fixed seat, the fixed seat being engaged with the carriage, the carriage includes a lock position and an unlock position in the axial direction of the connecting pipe, and the carriage is slidable between the lock position and the unlock position; when the carriage slides to the lock position, the fixed seat is engaged with the carriage to prevent the carriage from rotating relative to the axis X of the connecting pipe; and when the carriage slides to the unlock position, the fixed seat is disengaged from the carriage, and the carriage is rotatable relative to the axis X of the connecting pipe.

In an embodiment the carriage includes a first through hole, the first end of the connecting pipe is inserted into the first through hole, and at least part of the fixed seat is inserted into the first through hole.

In an embodiment, an end of the fixed seat is provided with a first limiting structure, and an outer wall of the fixed seat is provided with first teeth; an end of the first through hole of the carriage is provided with a second limiting structure, and an inner wall of the first through hole is provided with second teeth, the second limiting structure being capable of abutting against the first limiting structure to limit sliding of the carriage in the axial direction of the connecting pipe; when the carriage slides to a position where the first teeth are engaged with the second teeth, the carriage enters the lock position; when the carriage slides to a position where the first teeth are disengaged from the second teeth, the carriage enters the unlock position; and when the carriage slides to cause the second limiting structure to abut against the first limiting structure, the carriage reaches a first extreme position, in which case the first teeth are engaged with the second teeth, and the carriage is at the lock position.

In an embodiment, the outer wall of the fixed seat is provided with a plurality of first teeth distributed at equal intervals, and the inner wall of the first through hole is provided with a plurality of second teeth distributed at equal intervals.

In an embodiment, the pedal adjustment mechanism further includes a sleeve inserted into the first through hole, and the sleeve is provided with a second through hole, and the first end of the connecting pipe is inserted to and passes through the second through hole.

In an embodiment, the pedal adjustment mechanism further includes a spring sleeving an outer wall of the sleeve, so that the spring is arranged between at least part of the outer wall of the sleeve and the inner wall of the first through hole.

In an embodiment, the inner wall of the first through hole of the carriage is provided with a first rib protruding radially and inwardly, the outer wall of the sleeve is provided with a second rib protruding radially and inwardly, the first rib, the second rib, a part of the inner wall of the first through hole of the carriage located between the first rib and the second rib, and a part of the outer wall of the sleeve located between the first rib and the second rib jointly form an accommodating space, the spring is arranged in the accommodating space, and the spring constantly causes the carriage to slide towards the fixed seat, so that the spring constantly causes the second limiting structure of the carriage to abut against the first limiting structure of the fixed seat.

In an embodiment, when the carriage slides until the spring reaches a maximum compression state, the carriage reaches a second extreme position, in which case the carriage is at the unlock position.

In an embodiment, the pedal adjustment mechanism further includes a first pin, the connecting pipe is provided with a first pin hole, and the sleeve is provided with a second pin hole, the first pin passing through the first pin hole and the second pin hole, so that the sleeve is fixedly connected to the connecting pipe.

In an embodiment, the pedal adjustment mechanism further includes a second pin, the connecting pipe is provided with a third pin hole, and the fixed seat is provided with a fourth pin hole, the second pin passing through the third pin hole and the fourth pin hole, so that the fixed seat is fixedly connected to the connecting pipe.

In an embodiment, the fixed seat is roughly in a shape of a cylinder, the fixed seat is provided with a blind hole, and the first end of the connecting pipe is fixedly connected in the blind hole.

In an embodiment, the pedal is provided with a driving structure, which is configured to be operated by a user to drive the pedal to slide in the axial direction of the connecting pipe.

According to another aspect of the present disclosure, a nursing vehicle is further provided, and the nursing vehicle is provided with the pedal adjustment mechanism in any one of the above embodiments.

BRIEF DESCRIPTION OF THE DRAWINGS

Through more specific description of preferred embodiments of the present disclosure shown in the accompanying drawings, the above and other objectives, features, and advantages of the present disclosure will be clearer. In all the accompanying drawings, a same reference numeral denotes a same part. The drawings are not deliberately drawn to scale according to an actual size and the like, and a focus lies in highlighting the subject of the present disclosure.

Other features, objectives, and advantages of the present disclosure will become more apparent through reading of the detailed description of non-limiting embodiments with reference to the following accompanying drawings.

DETAILED DESCRIPTION OF THE EMBODIMENTS

To facilitate understanding of the present disclosure, a more comprehensive description of the present disclosure will be given below with reference to the relevant accompanying drawings. Preferred embodiments of the present disclosure are given in the accompanying drawings. However, the present disclosure may be implemented in many different forms and is not limited to the embodiments described herein. Rather, these embodiments are provided to make the content disclosed in the present disclosure more fully understood.

It is to be noted that when one component is considered to as being "connected to" another component, it may be directly connected the another component and integrated therewith, or an intermediate element may co-exist. The terms "mount", "an end", "another end", and similar expressions used herein are for illustrative purposes only.

Unless defined otherwise, all technical and scientific terms used herein have the same meanings as would generally be understood by those skilled in the technical field of the present disclosure. The terms used herein in the specification of the present disclosure are for the purpose of describing specific embodiments only, and are not intended to limit the present disclosure. The term "and/or" used herein includes any and all combinations of one or more related listed items.

Figure 1:
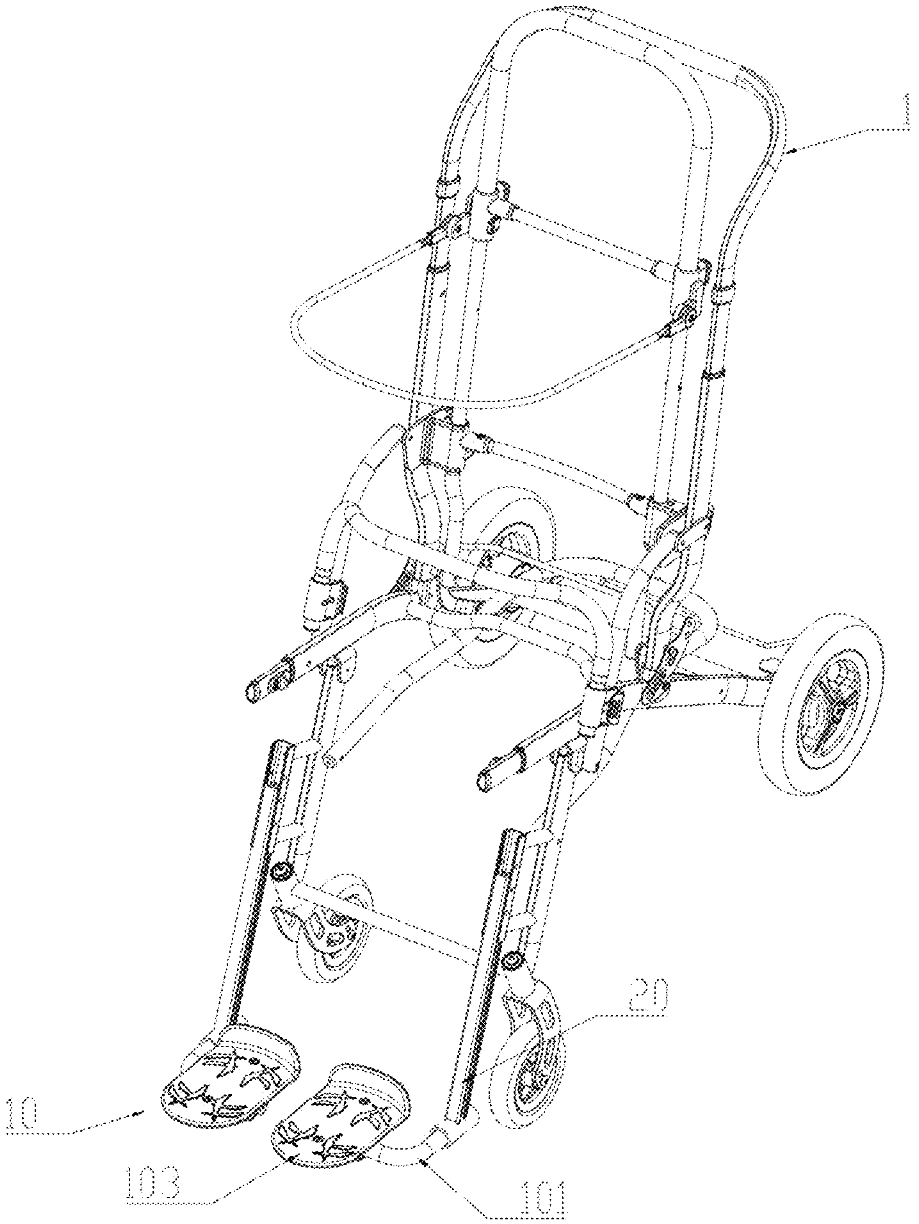
FIG. 1 is a schematic perspective view of a nursing vehicle according to an embodiment of the present disclosure.

Referring to FIG. 1, FIG. 1 shows a nursing vehicle 1 according to an embodiment of the present disclosure. The nursing vehicle 1 includes a vehicle body portion 20 and a pedal adjustment mechanism 10. The pedal adjustment mechanism 10 is connected to the vehicle body portion 20 of the nursing vehicle 1.

Figure 2:
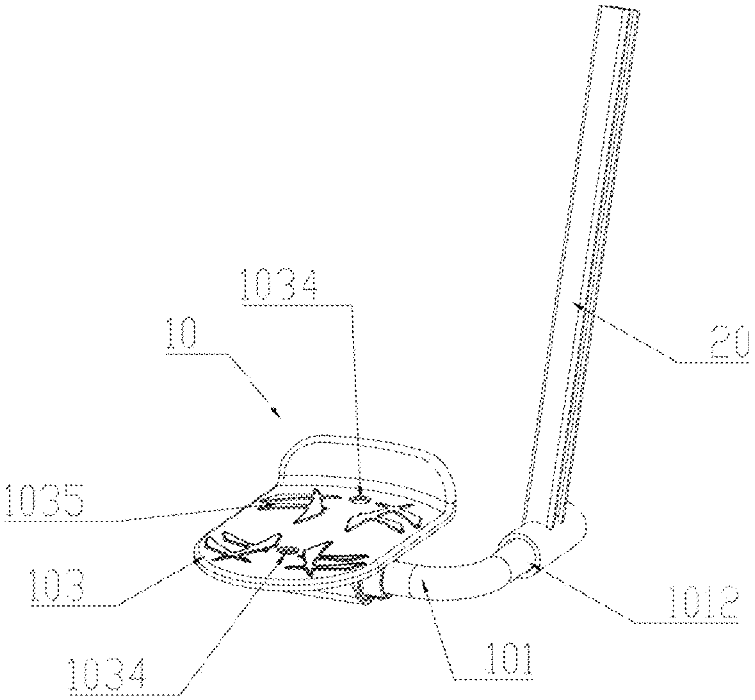
FIG. 2 is a schematic perspective view of a pedal adjustment mechanism according to an embodiment of the present disclosure.
Figure 3:
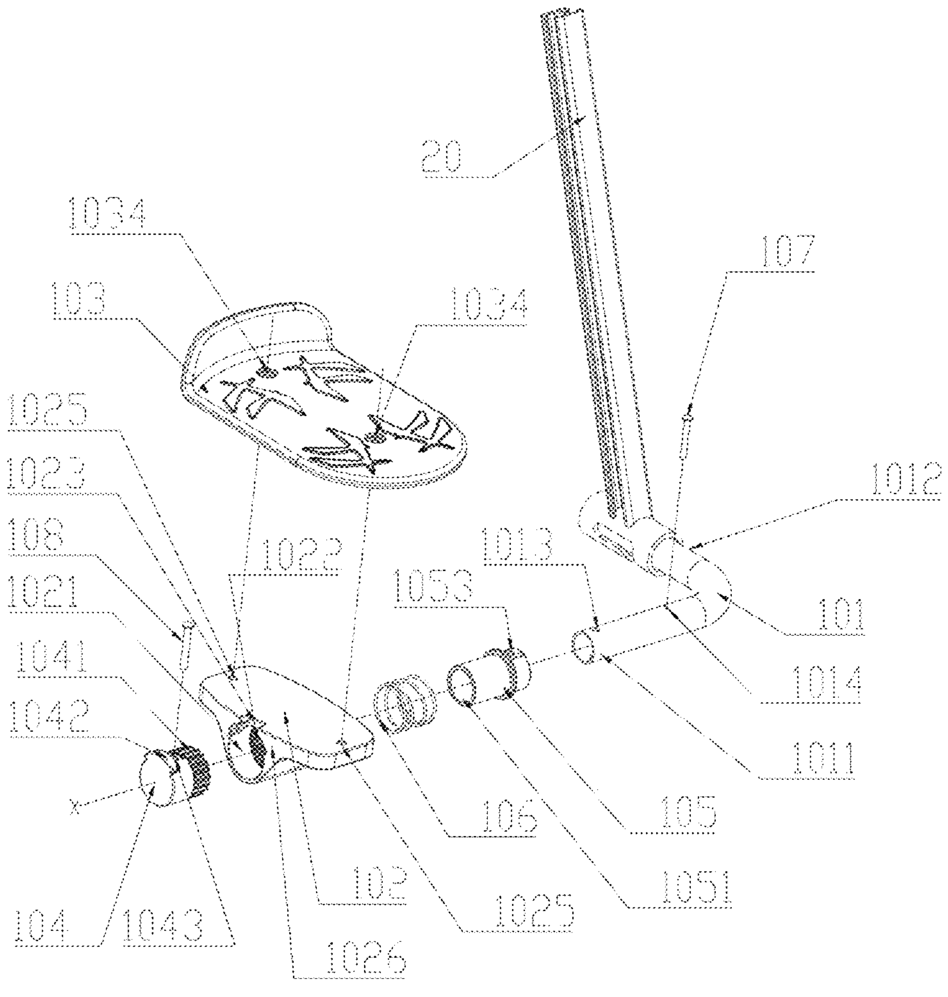
FIG. 3 is a schematic exploded view of the pedal adjustment mechanism according to an embodiment of the present disclosure.

Referring to FIG. 2 and FIG. 3 together, according to an embodiment of the present disclosure, the pedal adjustment mechanism 10 includes at least a connecting pipe 101, a carriage 102, a pedal 103, and a fixed seat 104. The connecting pipe 101 includes at least a first end 1011 and a second end 1012. The first end 1011 is inserted into the carriage 102 and is fixedly connected in the fixed seat 104. The second end 1012 is connected to the vehicle body portion 20. Optionally, the second end 1012 is fixedly connected to the vehicle body portion 20 or the second end 1012 is pivotally connected to the vehicle body portion 20.

Figure 4:
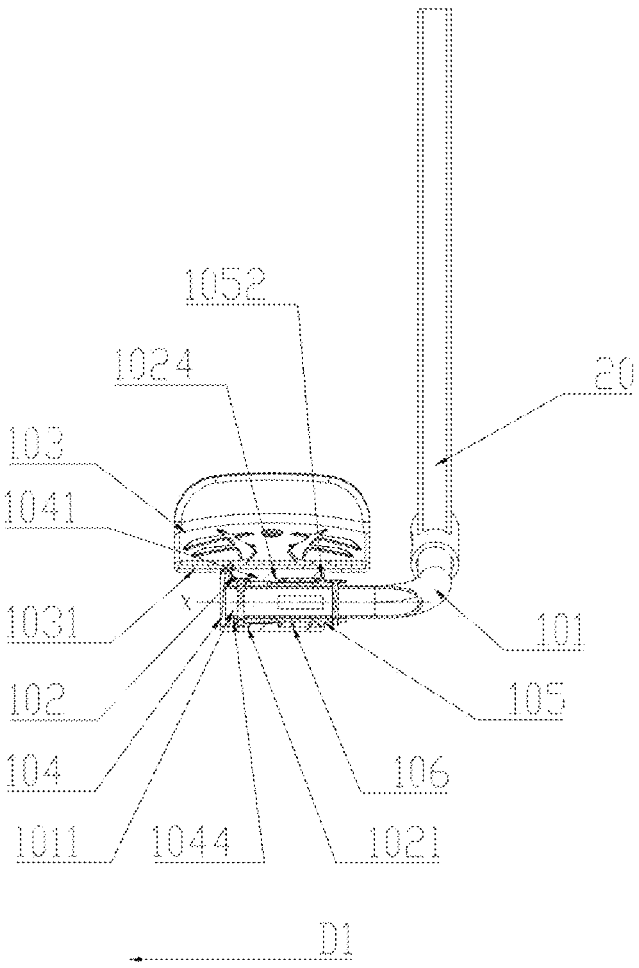
FIG. 4 is a partial sectional view of the pedal adjustment mechanism shown in FIG. 3, in which a pedal at a lock position is shown.

Referring to FIG. 3 and FIG. 4 together, according to an embodiment of the present disclosure, the carriage 102 is arranged on a lower surface 1031 of the pedal 103. Optionally, the carriage 102 is fixed to the pedal 103 through a detachable connection such as a bolt connection or a snap connection. Optionally, the carriage 102 is fixed to the pedal 103 through a non-detachable connection such as an adhesive connection, welding, riveting, or one-piece molding. Preferably, the carriage 102 is fixed to the pedal 103 through a bolt connection. Specifically, the pedal 103 is provided with a first connecting hole 1034, the carriage 102 is provided with a second connecting hole 1025, and the carriage 102 is fixed to the lower surface 1031 of the pedal 103 through cooperation of connectors such as bolts or nuts with the first connecting hole 1034 and the second connecting hole 1025. Still referring to FIG. 3 and FIG. 4, a first end 1011 of the connecting pipe 101 is inserted into the carriage 102, so that the carriage 102 is slidable in an axial direction of the connecting pipe 101 and the carriage 102 is rotatable relative to an axis X of the connecting pipe 101. The carriage 102 is fixed to the lower surface 1031 of the pedal 103, so the pedal 103 is slidable and/or rotatable together with the carriage 102. Therefore, the description related to sliding and rotation of the carriage 102 in the present disclosure is also applicable to the pedal 103.

Still referring to FIG. 3 and FIG. 4, the carriage 102 is provided with a first through hole 1021, the first end 1011 of the connecting pipe 101 is inserted into the first through hole 1021, and at least part of the fixed seat 104 is also inserted into the first through hole 1021. When the carriage 102 slides relative to the connecting pipe 101 in the axial direction of the connecting pipe 101, the carriage 102 can be engaged with the fixed seat 104 or can be disengaged from the fixed seat 104. Therefore, the carriage 102 can slide between a lock position and an unlock position in the axial direction.

When the carriage 102 slides to the lock position, the fixed seat 104 is engaged with the carriage 102, so that the carriage 102 is prevented from rotating relative to the axis X of the connecting pipe 101. When the carriage 102 slides to the unlock position, the fixed seat 104 is disengaged from the carriage 102, in which case the carriage 102 is rotatable relative to the axis X of the connecting pipe 101.

In actual use, when the carriage 102 slides to the lock position, i.e., the pedal 103 slides to the lock position, the pedal 103 cannot rotate relative to the axis X of the connecting pipe 101, so a use angle of the pedal 103 cannot be adjusted. When the carriage 102 slides to the unlock position, i.e., the pedal 103 slides to the unlock position, the pedal 103 can rotate relative to the axis X of the connecting pipe 101, so the use angle of the pedal 103 can be adjusted.

Figure 6:
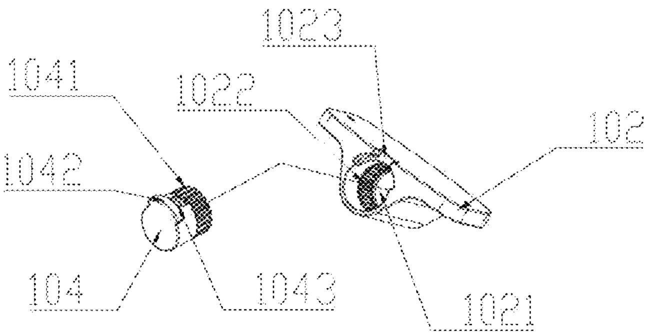
FIG. 6 is a schematic structural diagram of a carriage and a fixed seat of the pedal adjustment mechanism shown in FIG. 3.

Referring to FIG. 4 and FIG. 6 together, FIG. 4 is a partial sectional view of the pedal adjustment mechanism 10 in which the pedal 103 is at the lock position, and FIG. 6 is a schematic structural diagram of the carriage 102 and the fixed seat 104. In the embodiments shown in FIG. 4 and FIG. 6, an end of the fixed seat 104 is provided with a first limiting structure 1042, and an outer wall of the fixed seat 104 is provided with first teeth 1041. An end of the first through hole 1021 of the carriage 102 is provided with a second limiting structure 1023, and an inner wall of the first through hole 1021 is provided with second teeth 1022. Specifically, in this embodiment, the first limiting structure 1042 is a limiting protrusion. The limiting protrusion includes axial extension, a length of the axial extension being at least part of an axial length of a region in which the outer wall of the fixed seat 104 is not provided with the first teeth 1041; and peripheral extension, the peripheral extension being along a circumferential direction of the outer wall of the fixed seat 104. The second limiting structure 1023 is a limiting groove. The limiting groove includes axial extension, a length of the axial extension being at least part of an axial length of a region in which the inner wall of the first through hole 1021 is not provided with the second teeth 1022; and peripheral extension, the peripheral extension being along a circumferential direction of the inner wall of the first through hole 1021. The limiting groove can abut against the limiting protrusion to limit sliding of the carriage 102 in the axial direction. Specifically, when the limiting groove abuts against the limiting protrusion, the sliding of the carriage 102 along the axial direction towards the fixed seat 104 is limited.

Further, the limiting protrusion and the limiting groove in this embodiment may further limit an adjustable angle range of the carriage 102. Specifically, the peripheral extension of the limiting groove is greater than the peripheral extension of the limiting protrusion, so that, after the carriage 102 pivots by a certain angle around a direction of the X-axis, a projection of the limiting protrusion in the direction of the X-axis may still fall within a projection of the limiting groove in the direction of the X-axis. That is, the limiting groove can still abut against the limiting protrusion. In a case where the carriage 102 is at the unlock position and the carriage 102 pivots relative to the X-axis to cause the limiting protrusion to deviate from the limiting groove, at least part of the projection of the limiting protrusion in the direction of the X-axis no longer falls within the projection of the limiting groove in the direction of the X-axis. If the carriage 102 is caused to continuously slide along the axial direction towards the fixed seat 104, a surface 1026 of the carriage 102 facing the fixed seat 104 will abut against the limiting protrusion, while the limiting groove cannot abut against the limiting protrusion. In this case, the user could easily realize that an angular range of the pedal 103 is in an abnormal state and may actively adjust a pivot position of the pedal 103 (the carriage 102), which will be further described below in the description of a use principle of the pedal adjustment mechanism 10. Those skilled in the art should realize that the first limiting structure 1042 and the second limiting structure 1023 may alternatively be other suitable structures, as long as the sliding of the carriage 102 in the axial direction towards the fixed seat 104 and a pivot position of the carriage 102 around the X-axis can be limited through the cooperation of the first limiting structure 1042 and the second limiting structure 1023, which is not limited in the present disclosure.

In this embodiment, a plurality of first teeth 1041 are arranged at intervals on the outer wall of the fixed seat 104 along the circumferential direction of the outer wall of the fixed seat 104, and protrude from the outer wall of the fixed seat 104 in a radial direction. The plurality of first teeth 1041 are arranged at equal intervals on the outer wall of the fixed seat 104 along the circumferential direction of the outer wall of the fixed seat 104. The first teeth 1041 are, for example, in an elongated shape. That is, first extension of the first teeth 1041 in a direction parallel to the X-axis is greater than second extension of the first teeth 1041 in a direction parallel to the circumferential direction of the outer wall of the fixed seat 104. A plurality of second teeth 1022 are arranged at intervals on the inner wall of the first through hole 1021 along the circumferential direction of the inner wall of the first through hole 1021, and protrude from the inner wall of the first through hole 1021 in a radial direction. Preferably, the plurality of second teeth 1022 are arranged at equal intervals on the inner wall of the first through hole 1021 along the circumferential direction of the inner wall of the first through hole 1021. The second teeth 1022 are, for example, in an elongated shape. That is, third extension of the second teeth 1022 in a direction parallel to the X-axis is greater than fourth extension of the second teeth 1022 in a direction parallel to the circumferential direction of the inner wall of the first through hole 1021. Optionally the first extension of the first teeth 1041 is equal to the third extension of the second teeth 1022. Optionally, the second extension of the first teeth 1041 is equal to the fourth extension of the second teeth 1022. The second extension of the first teeth 1041 is less than or equal to a minimum spacing of the second teeth 1022 in the circumferential direction of the inner wall of the first through hole 1021, and the fourth extension of the second teeth 1022 is less than or equal to a minimum spacing of the first teeth 1041 in the circumferential direction of the outer wall of the fixed seat 104. Therefore, when the carriage 102 slides towards the fixed seat 104 and the first extension of the first teeth 1041 and the third extension of the second teeth 1022 are staggered from each other in a direction parallel to the X-axis, when the first teeth 1041 and the second teeth 1022 may enter intervals therebetween, thereby realizing engagement of the first teeth 1041 with the second teeth 1022. Optionally, a quantity of the first teeth 1041 is the same as or different from a quantity of second teeth 1022. Preferably, the quantity of the first teeth 1041 is the same as the quantity of second teeth 1022.

When the carriage 102 slides to a position where the first teeth 1041 are engaged with the second teeth 1022, the pivoting of the carriage 102 around the X-axis is limited, and the carriage 102 enters the lock position. When the carriage 102 slides to a position where the first teeth 1041 are disengaged from the second teeth 1022, the pivoting of the carriage 102 around the X-axis is released, and the carriage 102 enters the unlock position. When the carriage 102 slides until the limiting groove abuts against the limiting protrusion, the carriage 102 reaches a first extreme position, in which case the first teeth 1041 are engaged with the second teeth 1022 and the carriage 102 is at the lock position.

In actual use, the user may move the carriage 102 away from the fixed seat 104 in a direction parallel to the X-axis, for example, by placing a foot on the pedal 103, so that the first teeth 1041 are disengaged from the second teeth 1022, and the carriage 102 enters the unlock position. Moreover, the user may pivot the carriage 102 about the X-axis to adjust an angular position of the carriage 102, for example, by placing the foot on the pedal 103, so that the first extension of the first teeth 1041 and the third extension of the second teeth 1022 are staggered from each other in a direction parallel to the X-axis, to allow the first teeth 1041 to be engaged with the second teeth 1022.

Referring to FIG. 3 and FIG. 4 again, according to an embodiment of the present disclosure, the pedal adjustment mechanism 10 includes a sleeve 105. The sleeve 105 is inserted into the first through hole 1021 of the carriage 102. The sleeve 105 has a second through hole 1051. The first end 1011 of the connecting pipe 101 is inserted into and passes through the second through hole 1051. In other words, the sleeve 105 sleeves the first end 1011 of the connecting pipe 101 and is located in the first through hole 1021 of the carriage 102. That is, the sleeve 105 is arranged between the carriage 102 and the connecting pipe 101.

The pedal adjustment mechanism 10 further includes a driving member. The driving member constantly causes the carriage 102 to slide towards the fixed seat 104. The carriage 102 is constantly caused to slide to the first extreme position where the limiting groove abuts against the limiting protrusion. Specifically, in this embodiment, the driving member is a spring 106. Those skilled in the art should realize that the driving member may alternatively be other suitable components, such as an elastic piece or a magnet, provided that the carriage 102 has a motion tendency to slide towards the fixed seat 104, which is not limited in the present disclosure.

In this embodiment, the spring 106 sleeves the outer wall of the sleeve 105 and is arranged between at least part of the outer wall of the sleeve 105 and the inner wall of the carriage 102. The inner wall of the carriage 102 is provided with a radially inwardly protruding first rib 1024, and the outer wall of the sleeve 105 is provided with a radially inwardly protruding second rib 1052. The first rib 1024, the second rib 1052, a part of the inner wall of the carriage 102 located between the first rib 1024 and the second rib 1052, and a part of the outer wall of the sleeve 105 located between the first rib 1024 and the second rib 1052 jointly form an accommodating space. The spring 106 is arranged in the accommodating space. Moreover, one end of the spring 106 abuts against a side wall of the first rib 1024, the other end of the spring 106 abuts against a side wall of the second rib 1052, and the spring 106 is constantly in a compressed state. Therefore, an elastic force of the spring 106 extrudes the side wall of the first rib 1024 of the carriage 102 along a direction D1 (in the other pedal 103 not shown in FIG. 4, the elastic force of the spring 106 extrudes the side wall of the first rib 1024 of the carriage 102 along a direction opposite to the direction D1), so that the carriage 102 constantly has a motion tendency to slide towards the first extreme position.

Figure 5:
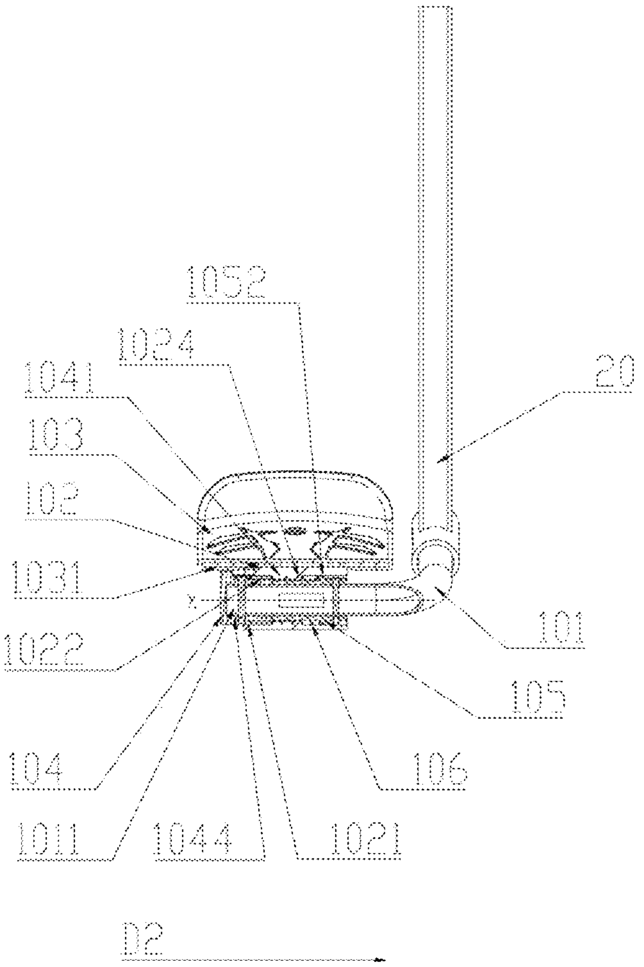
FIG. 5 is a partial sectional view of the pedal adjustment mechanism shown in FIG. 3, in which the pedal at an unlock position is shown.

Referring to FIG. 5, FIG. 5 is a partial sectional view of the pedal adjustment mechanism 10 at the unlock position. In the embodiment shown in FIG. 5, under an external force (e.g., exerted by a foot of a user), the carriage 102 slides along a direction D2 to the second extreme position. In this case, the first teeth 1041 are disengaged from the second teeth 1022. That is, the carriage 102 and the pedal 103 are at the unlock position. The spring 106 reaches a maximum compression state. In this case, if the external force is removed, the carriage 102 may automatically slide towards the first extreme position under the spring 106. That is, the carriage 102 automatically slides towards the lock position.

Referring to FIG. 3 again, according to an embodiment of the present disclosure, the pedal adjustment mechanism 10 may further include a first fixing mechanism. The first fixing mechanism includes at least a first pin 107; a first pin hole 1014 arranged on the connecting pipe 101, and a second pin hole 1053 arranged on the sleeve 105. The first pin 107 passes through the first pin hole 1014 and the second pin hole 1053, thereby fixedly connecting the sleeve 105 to the connecting pipe 101 through the first fixing mechanism. Those skilled in the art should realize that the first fixing mechanism may alternatively be other suitable fixing mechanisms, such as an engaging mechanism or a threaded mechanism, as long as a fixed connection between the sleeve 105 and the connecting pipe 101 can be realized, which is not limited in the present disclosure.

Further, the pedal adjustment mechanism 10 may further include a second fixing mechanism. The second fixing mechanism includes at least a second pin 108; a third pin hole 1013 arranged on the connecting pipe 101, and a fourth pin hole 1043 arranged on the fixed seat 104. The second pin 108 passes through the third pin hole 1013 and the fourth pin hole 1043, thereby fixedly connecting the fixed seat 104 to the connecting pipe 101 through the second fixing mechanism. Those skilled in the art should realize that the second fixing mechanism may alternatively be other suitable fixing mechanisms, such as an engaging mechanism or a threaded mechanism, as long as a fixed connection between the fixed seat 104 and the connecting pipe 101 can be realized, which is not limited in the present disclosure.

Referring to FIG. 4 and FIG. 6 again, according to an embodiment of the present disclosure, the fixed seat 104 may be roughly in a shape of a cylinder, the fixed seat 104 is provided with a blind hole 1044, and the first end 1011 of the connecting pipe 101 is fixedly connected in the blind hole 1044. Specifically, the first end 1011 of the connecting pipe 101 is inserted into the blind hole 1044, and the first end 1011 is fixedly connected in the blind hole 1044 through the second fixing mechanism.

Figure 7:
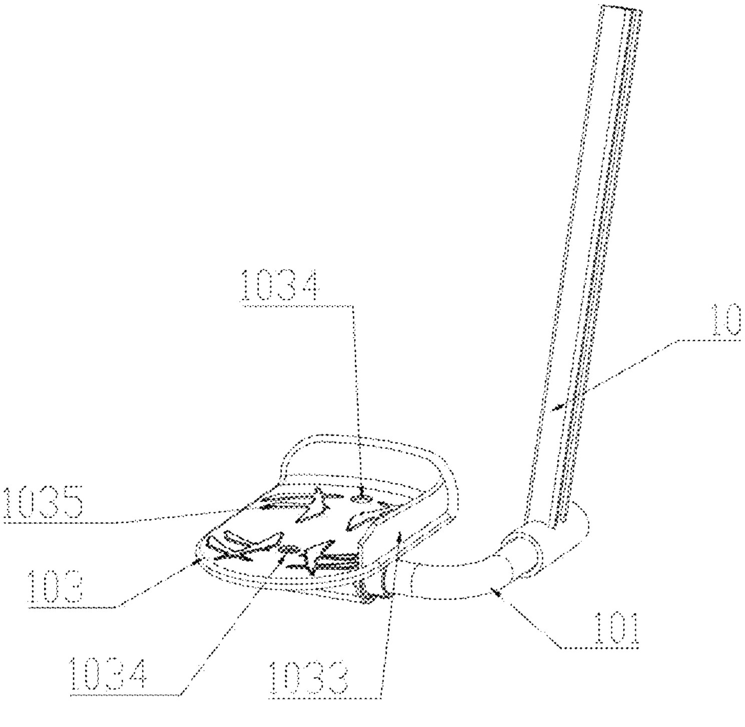
FIG. 7 is a schematic perspective view of a pedal adjustment mechanism according to an embodiment of the present disclosure.

Referring to FIG. 2 and FIG. 7 together, according to an embodiment of the present disclosure, an upper surface of the pedal 103 may be provided with an anti-slip bulge 1035 to increase a friction force between a sole of the foot and the upper surface of the pedal 103 and prevent slippage of the sole of the foot on the upper surface of the pedal 103, thereby further eliminating personal safety risks of the user caused by slippage. The upper surface of the pedal 103 may be further provided with a driving structure, and the user may force the pedal 103 to slide towards the second extreme position through operating the driving structure. Specifically, in this embodiment, the driving structure is a catch 1033 arranged on the upper surface of the pedal 103, and the catch 1033 is arranged on an outer side of the pedal 103 in the axial direction of the connecting pipe 101. When the user is seated in the nursing vehicle 1, the user may easily apply a lateral force towards the direction D2 (refer to FIG. 5) to the catch 1033 through the foot placed on the pedal 103 (a lateral force towards a direction opposite to the direction D2 is applied to the other pedal 103 not shown in FIG. 7), thereby forcing the pedal 103 to drive the carriage 102 to overcome the elastic force of the spring 106 and slide to the second extreme position, so that the pedal 103 enters the unlock position to adjust the use angle of the pedal 103.

Figure 8:
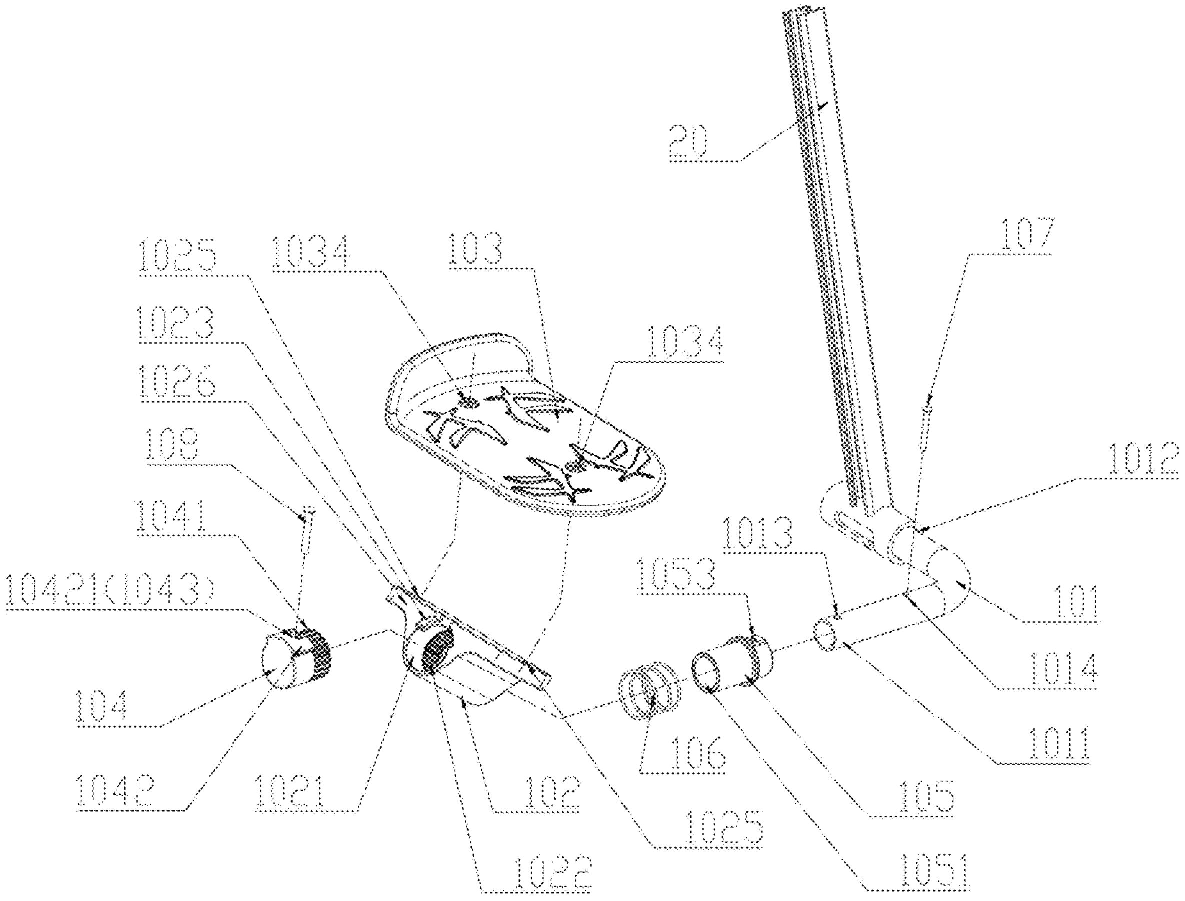
FIG. 8 is a schematic exploded view of the pedal adjustment mechanism according to an embodiment of the present disclosure.
Figure 9:
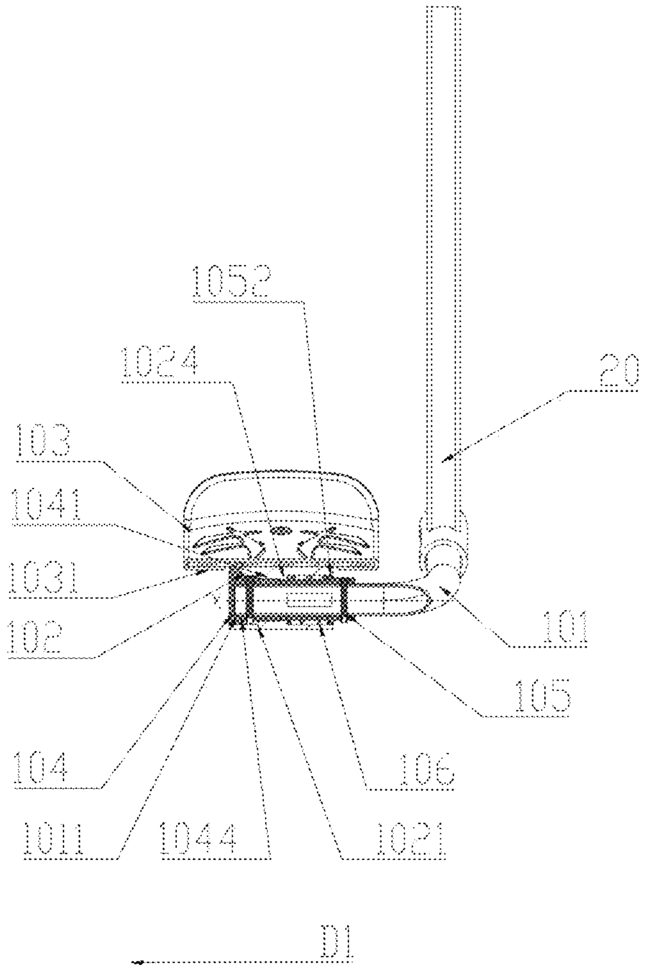
FIG. 9 is a partial sectional view of the pedal adjustment mechanism shown in FIG. 8, in which a pedal at a lock position is shown.
Figure 10:
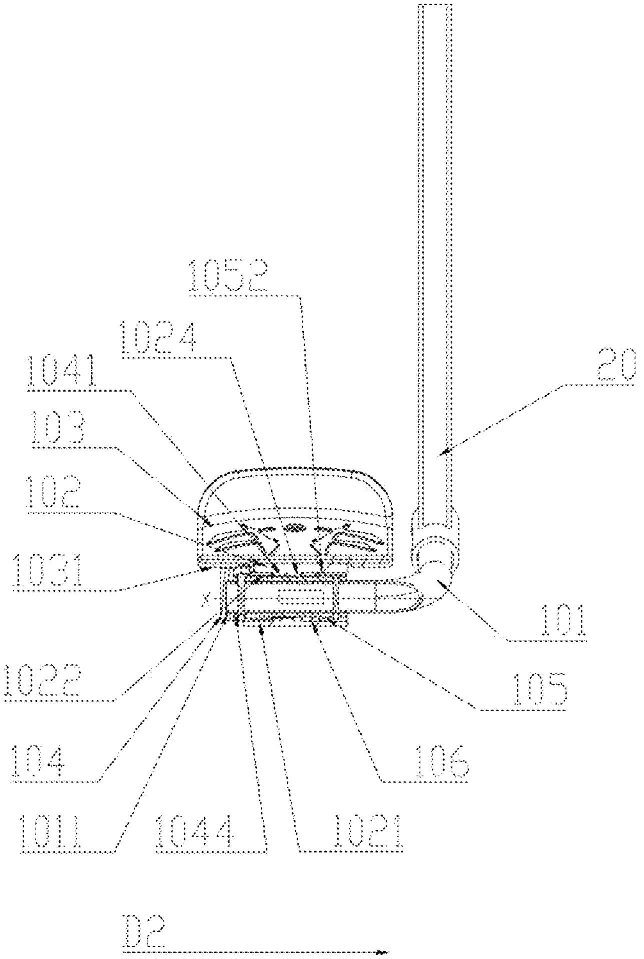
FIG. 10 is a partial sectional view of the pedal adjustment mechanism shown in FIG. 8, in which the pedal at an unlock position is shown.

Referring to FIG. 8, FIG. 9, and FIG. 10 together, FIG. 8 is a schematic exploded view of a pedal adjustment mechanism according to an embodiment of the present disclosure, FIG. 9 is a partial sectional view of the pedal adjustment mechanism shown in FIG. 8, in which a pedal at a lock position is shown, and FIG. 10 is a partial sectional view of the pedal adjustment mechanism shown in FIG. 8, in which the pedal at an unlock position is shown. The pedal adjustment mechanism 10 in this embodiment and the pedal adjustment mechanism 10 in the embodiment shown in FIG. 3 are basically the same in structure, and are different in specific structures of the first limiting structure 1042 and the second limiting structure 1023. Specifically, in this embodiment, the first limiting structure 1042 is a limiting protrusion, and the second limiting structure 1023 is a limiting groove. The limiting protrusion includes axial extension, a length of the axial extension being an axial length of a region in which the outer wall of the fixed seat 104 is not provided with the first teeth 1041; and peripheral extension, the peripheral extension being along the circumferential direction of the outer wall of the fixed seat 104. The limiting groove includes axial extension, a length of the axial extension being an axial length of at least part of a region in which the inner wall of the first through hole 1021 is not provided with the second teeth 1022; and peripheral extension, the peripheral extension being along the circumferential direction of the inner wall of the first through hole 1021. The limiting groove can abut against the limiting protrusion to limit sliding of the carriage 102 in the axial direction. For example, when the limiting groove abuts against the limiting protrusion, the sliding of the carriage 102 along the axial direction towards the fixed seat 104 is limited. Optionally, the limiting protrusion is provided with an avoidance opening 10421 for avoiding the fourth pin hole 1043, and the avoidance opening 10421 can allow the second pin 108 to pass through.

In the embodiment shown in FIG. 8, the peripheral extension of the limiting groove is greater than the peripheral extension of the limiting protrusion, so that, after the carriage 102 pivots by a certain angle around a direction of the X-axis, a projection of the limiting protrusion in the direction of the X-axis may still fall within a projection of the limiting groove in the direction of the X-axis. That is, the limiting groove can still abut against the limiting protrusion. In a case where the carriage 102 is at the unlock position and the carriage 102 pivots relative to the X-axis to cause the limiting protrusion to deviate from the limiting groove, at least part of the projection of the limiting protrusion in the direction of the X-axis no longer falls within the projection of the limiting groove in the direction of the X-axis. If the carriage 102 is caused to continuously slide along the axial direction towards the fixed seat 104, a surface 1026 of the carriage 102 facing the fixed seat 104 will abut against the limiting protrusion, while the limiting groove cannot abut against the limiting protrusion, so the carriage 102 cannot enter the first extreme position. In this case, the first teeth 1041 and the second teeth 1022 are in positions where they are not yet engaged. That is, projections of the first teeth 1041 and the second teeth 1022 on a plane where the X-axis is located do not coincide with each other, and the carriage 102 cannot be locked. In this case, the user will easily realize that the angular range of the pedal 103 is in an abnormal state and may actively adjust the use angle (pivot position) of the pedal 103 (the carriage 102). Therefore, a limitation on an appropriate angular position of the pedal 103 is realized.

A use principle of the pedal adjustment mechanism 10 according to embodiments of the present disclosure will be described below in conjunction with the embodiments shown in FIG. 3 and FIG. 8.

When the pedal 103 is at an initial position, the pedal 103 is at the first extreme position. In this case, the first teeth 1041 are engaged with the second teeth 1022, the carriage 102 (the pedal 103) is at the lock position, and the usage angle of the pedal 103 is not allowed to be adjusted.

When the user does not apply any lateral force to the catch 1033 or the lateral force applied is less than the elastic force of the spring 106, the pedal 103 will remain at the first extreme position under the action of the spring 106, and the usage angle of the pedal 103 is not allowed to be adjusted.

When the lateral force applied by the user to the catch 1033 is greater than the elastic force of the spring 106, the lateral force will drive the pedal 103 and the carriage 102 to overcome the elastic force of the spring 106 to gradually slide towards the second extreme position to a position where the first teeth 1041 are disengaged from the second teeth 1022, and the carriage 102 (the pedal 103) enters the unlock position accordingly. In this case, the user may further apply downward pressure to the pedal 103 to force the carriage 102 to pivot clockwise or counterclockwise around the X-axis, so as to adjust the use angle of the pedal 103. When the use angle of the pedal 103 is adjusted to an angle required by the user, the user removes the lateral force, and the carriage 102 (the pedal 103) will automatically slide towards the first extreme position under the elastic force of the spring 106 while maintaining the pivoted angle. Then, there will then be three possible situations.

a) If the projection of the limiting protrusion in the direction of the X-axis may still fall within the projection of the limiting groove in the direction of the X-axis and the first extension of the first teeth 1041 and the third extension of the second teeth 1022 are appropriately staggered from each other in the direction parallel to the X-axis, the carriage 102 automatically enters the lock position under the elastic force of the spring 106, thereby completing the adjustment on the use angle of the pedal 103.

b) If the projection of the limiting protrusion in the direction of the X-axis may still fall within the projection of the limiting groove in the direction of the X-axis but the first extension of the first teeth 1041 and the third extension of the second teeth 1022 are not appropriately staggered from each other in the direction parallel to the X-axis, the carriage 102 may automatically slide towards the first extreme position under the elastic force of the spring 106 until adjacent end portions of the first teeth 1041 and the second teeth 1022 abut against each other. In this case, the user only needs to lightly press the pedal 103 to slightly adjust the pivot angle of the carriage 102, so that the second teeth 1022 and the first teeth 1041 can be appropriately staggered from each other in the direction parallel to the X-axis. So far, the carriage 102 will continue to slide towards the fixed seat 104 under the elastic force of the spring 106, so that the first teeth 1041 are engaged with the second teeth 1022, and the carriage 102 enters the lock position, thereby completing the adjustment on the use angle of the pedal 103.

c) If the projection of the limiting protrusion in the direction of the X-axis no longer falls within the projection of the limiting groove in the direction of the X-axis, the carriage 102 may automatically slide towards the first extreme position under the elastic force of the spring 106 until the surface 1026 of the carriage 102 facing the fixed seat 104 abuts against the limiting protrusion. In this case, the user may easily realize, through an abnormal position of the pedal 103 in the direction of the X-axis (such as the embodiment of FIG. 3) and/or incapability of the pedal 103 to enter the lock position (such as the embodiment of FIG. 8) that the use angle of the pedal 103 is in an abnormal state. The user still only needs to lightly press the pedal 103 to further adjust the pivot angle of the carriage 102, so that the pivot angle of the carriage 102 reaches the state in the situation a) above, and the carriage 102 can automatically enter the lock position under the elastic force of the spring 106, thereby completing the adjustment on the use angle of the pedal 103.

The pedal adjustment mechanism 10 according to embodiments of the present disclosure has a simple structure, is easy to operate, and can be operated by the user of the nursing vehicle 1 independently without assistance of others, thereby simplifying an adjustment operation on the pedal 103 and improving convenience of use of the nursing vehicle 1.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the invention. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A pedal adjustment mechanism for a nursing vehicle, wherein the pedal adjustment mechanism comprises:

a connecting pipe connected to the nursing vehicle;

a carriage, a first end of the connecting pipe being inserted into the carriage, so that the carriage is slidable in an axial direction of the connecting pipe and the carriage is rotatable relative to an axis (X) of the connecting pipe;

a pedal, the carriage being fixedly connected to a lower surface of the pedal, so that the pedal is slidable and/or rotatable together with the carriage; and a fixed seat, the first end of the connecting pipe being fixedly connected in the fixed seat, the fixed seat being engaged with the carriage, wherein the carriage comprises a lock position and an unlock position in the axial direction of the connecting pipe, and the carriage is slidable between the lock position and the unlock position;

when the carriage slides to the lock position, the fixed seat is engaged with the carriage to prevent the carriage from rotating relative to the axis (X) of the connecting pipe; and when the carriage slides to the unlock position, the fixed seat is disengaged from the carriage, and the carriage is rotatable relative to the axis (X) of the connecting pipe.

2. The pedal adjustment mechanism of claim 1, wherein the carriage comprises a first through hole, the first end of the connecting pipe is inserted into the first through hole, and at least part of the fixed seat is inserted into the first through hole.

3. The pedal adjustment mechanism of claim 2, wherein an end of the fixed seat is provided with a first limiting structure, and an outer wall of the fixed seat is provided with first teeth;

an end of the first through hole of the carriage is provided with a second limiting structure, and an inner wall of the first through hole is provided with second teeth, the second limiting structure being capable of abutting against the first limiting structure to limit sliding of the carriage in the axial direction of the connecting pipe;

when the carriage slides to a position where the first teeth are engaged with the second teeth, the carriage enters the lock position;

when the carriage slides to a position where the first teeth are disengaged from the second teeth, the carriage enters the unlock position; and when the carriage slides to cause the second limiting structure to abut against the first limiting structure, the carriage reaches a first extreme position, in which case the first teeth are engaged with the second teeth, and the carriage is at the lock position.

4. The pedal adjustment mechanism of claim 3, wherein the outer wall of the fixed seat is provided with a plurality of first teeth distributed at equal intervals, and the inner wall of the first through hole is provided with a plurality of second teeth distributed at equal intervals.

5. The pedal adjustment mechanism of claim 3, wherein the pedal adjustment mechanism further comprises a sleeve inserted into the first through hole, and the sleeve is provided with a second through hole, and the first end of the connecting pipe is inserted to and passes through the second through hole.

6. The pedal adjustment mechanism of claim 5, wherein the pedal adjustment mechanism further comprises a spring sleeving an outer wall of the sleeve, so that the spring is arranged between at least part of the outer wall of the sleeve and the inner wall of the first through hole.

7. The pedal adjustment mechanism of claim 6, wherein the inner wall of the first through hole of the carriage is provided with a first rib protruding radially and inwardly, the outer wall of the sleeve is provided with a second rib protruding radially and inwardly, the first rib, the second rib, a part of the inner wall of the first through hole of the carriage located between the first rib and the second rib, and a part of the outer wall of the sleeve located between the first rib and the second rib jointly form an accommodating space, the spring is arranged in the accommodating space, and the spring constantly causes the carriage to slide towards the fixed seat, so that the spring constantly causes the second limiting structure of the carriage to abut against the first limiting structure of the fixed seat.

8. The pedal adjustment mechanism of claim 7, wherein when the carriage slides until the spring reaches a maximum compression state, the carriage reaches a second extreme position, in which case the carriage is at the unlock position.

9. The pedal adjustment mechanism of claim 5, wherein the pedal adjustment mechanism further comprises a first pin, the connecting pipe is provided with a first pin hole, and the sleeve is provided with a second pin hole, the first pin passing through the first pin hole and the second pin hole, so that the sleeve is fixedly connected to the connecting pipe.

10. The pedal adjustment mechanism of claim 9, wherein the pedal adjustment mechanism further comprises a second pin, the connecting pipe is provided with a third pin hole, and the fixed seat is provided with a fourth pin hole, the second pin passing through the third pin hole and the fourth pin hole, so that the fixed seat is fixedly connected to the connecting pipe.

11. The pedal adjustment mechanism of claim 1, wherein the fixed seat is roughly in a shape of a cylinder, the fixed seat is provided with a blind hole, and the first end of the connecting pipe is fixedly connected in the blind hole.

12. The pedal adjustment mechanism of claim 1, wherein the pedal is provided with a driving structure, which is configured to be operated by a user to drive the pedal to slide in the axial direction of the connecting pipe.

13. A nursing vehicle, wherein the nursing vehicle is provided with the pedal adjustment mechanism of claim 1.

* * * * *